(12) United States Patent
Cole (10) Patent No.: US 12,323,387 B2
(45) Date of Patent: Jun. 3, 2025

(54) METHOD AND SYSTEM FOR COMMUNICATION VIA A CELLULAR COMMUNICATION DEVICE VIA A SECURE USER INTERFACE

(71) Applicant: CONCERAS, LLC., Fairfax, VA (US)

(72) Inventor: Joseph Cole, Box Elder, SD (US)

(73) Assignee: CONCERAS, LLC, Fairfax, VA (US)

( * ) Notice: Subject to any disclaimer, the term of this patent is extended or adjusted under 35 U.S.C. 154(b) by 270 days.

(21) Appl. No.: 18/199,234

(22) Filed: May 18, 2023

(65) Prior Publication Data

US 2024/0388566 A1  Nov. 21, 2024

(51) Int. Cl.
H04L 9/40 (2022.01)

(52) U.S. Cl.
CPC ...... H04L 63/0209 (2013.01); H04L 63/0492 (2013.01)

(58) Field of Classification Search
CPC . H04L 63/0209; H04L 63/0492; H04W 12/63
See application file for complete search history.

(56) References Cited

U.S. PATENT DOCUMENTS

| 8,750,903 | B1 | 6/2014 | Fitzsimmons et al. |
| 11,135,916 | B2* | 10/2021 | Gerlach ................ G06F 3/1454 |
| 2012/0288265 | A1 | 11/2012 | Wun |
| 2014/0277937 | A1* | 9/2014 | Scholz ...................... G06F 7/00 701/1 |
| 2016/0241523 | A1* | 8/2016 | Ahn ..................... H04L 63/0428 |
| 2016/0242095 | A1* | 8/2016 | Brooksby .............. H04N 7/147 |
| 2017/0150227 | A1* | 5/2017 | Kim ..................... G06Q 20/326 |
| 2020/0175796 | A1 | 6/2020 | Kirchhausen |
| 2021/0335067 | A1 | 10/2021 | Shelton et al. |
| 2022/0095114 | A1 | 3/2022 | Bishop et al. |

(Continued)

FOREIGN PATENT DOCUMENTS

| CN | 104598846 | 5/2015 |
| CN | 204463135 | 7/2015 |
| CN | 1035376747 | 3/2016 |

(Continued)

OTHER PUBLICATIONS

PCT Search Report and Written Opinion for International Application No. PCT/US24/28752, mailed Aug. 20, 2024, 15 pages.

*Primary Examiner* — Lynn D Feild
*Assistant Examiner* — Abdullah Almamun
(74) *Attorney, Agent, or Firm* — Snell & Wilmer L.L.P.

(57) ABSTRACT

Methods, devices and systems allow a user to utilize their cellular or WiFi communication device from within a secure area, preferably via a secure user interface that is communicatively coupled to their device which is located outside of the secure area. The system includes a communication interface located outside of the secure area which serves as an interface to the user communication device, and which communicates with a secure user interface within the secure user interface by one or more communication isolators that transmit information between the secure and unsecure areas via optical communication signals. The secure user interface includes a touch screen display, speaker, microphone and keyboard for presenting outputs and receiving inputs in a manner that mimics direct interaction with the user communication device.

20 Claims, 5 Drawing Sheets

(56) References Cited

U.S. PATENT DOCUMENTS

2023/0214503 A1 * 7/2023 Jung .................. H04L 9/008
713/189

FOREIGN PATENT DOCUMENTS

| CN | 205213048 | 5/2016 | | |
|----|-----------|--------|---|---|
| CN | 213126043 | 5/2021 | | |
| ES | 2631778 | 9/2017 | | |
| KR | 102591439 B1 * | 10/2023 | ......... | H04L 63/0209 |
| WO | 2014014369 | 1/2014 | | |

* cited by examiner

METHOD AND SYSTEM FOR COMMUNICATION VIA A CELLULAR COMMUNICATION DEVICE VIA A SECURE USER INTERFACE

FIELD OF THE INVENTION

The present invention relates to communication devices and systems, and in particular those which include the use of wireless devices in association with secure spaces.

BACKGROUND OF THE INVENTION

With cell phones becoming ubiquitous in our everyday lives, a unique problem arises in the Military and Government sector where cell phones are not allowed in controlled or secure spaces where secure (proprietary, classified, etc.) information is processes and discussed. These restrictions limited a person's ability to function at the workplace, in that most employees heavily rely on their cell phones because they store important information (contacts lists, photographs, etc.), serve as a communication interface for calls, texts and emails, VOIP telco, social media communications applications such as WhatsAPP, FaceBook Messager, and operate important applications such as home security interfaces, web browsers, etc.

Generating a solution to address the problems that are created because a user's cell phone can't be brough into such a secure area is, however, difficult. This is in part because of the numerous security-related requirements and objectives which prevent a user from bringing their phone into the secure space.

For example, for security purposes, no device which emanates a radio frequency (RF) signal is allowed into controlled spaces-which includes not only cellular signals, but WiFi, Bluetooth, near field (NF) and other RF technologies. This prevents, for example, a solution in which the user leaves their phone outside of the secure space but then links to it from a device within the space via such wireless protocols.

A user is also prevented from bringing their phone into such a space because the phone could potentially be tampered with to include a separate device "bug" to send a signal outside the controlled space. Thus, the user's phone can't be brought into the space even if the wireless communications thereof are not utilized-effectively removing the ability to utilize any device in the secure space which can communicate wirelessly.

Communications signaling via wired (e.g. copper) connection outside these spaces are also forbidden as it creates a security issue in that it could potentially acts as an antenna to shunt a radiated signal intended to remain in the secure area and providing a means of sending that signal out.

Communication devices contained within these controlled workspaces must also be secured relative to the user interface features thereof. For example, no cameras are allowed in these space, and measures must be taken to ensure the microphone and or speaker of any device can't be accessed to remotely eavesdrop on the secure space.

A solution to these problems is desired.

SUMMARY OF THE INVENTION

Aspects of the invention comprise methods, devices and systems which allow a user to utilize their cellular communication device from within a secure area, via a secure user interface that is communicatively coupled to their device which is located outside of the secure area via an isolated methodology.

One embodiment of the invention comprises a system facilitating secure communications with a user communication device from a secure area comprising: a communication interface for location in an unsecure area, the communication interface comprising a first communication port for connection to a communication port of the user communication device and at least one second communication port; a first communication isolator for location in the unsecure area, the first communication isolator comprising at least one first communication port for connection to the at least one second communication port of the communication interface and at least one optical communication port; a second communication isolator for location in a secure area, the second communication isolator comprising at least one optical communication port for connection to the at least one optical communication port of said first communication port to permit communications between said first and second communication isolators via an optical communications channel and at least one user interface communication port; and a secure user interface for location in said secure area, said secure user interface comprising at least one communication port for connection to the at least one user interface communication port, the secure user interface comprising a video display having touch input, at least one speaker and at least one microphone (preferably via a positive disconnect configuration), whereby a user within the secure area may securely communicate with their user communication device outside the secure area via the secure user interface, including providing inputs to the user communication device and receiving outputs therefrom.

A method of facilitating secure communications to and from a user in a secure area via an unsecured user communication device comprising the steps of: receiving, at a communication interface located outside of the secure area, an output from the user communication device; transmitting the output to the communication interface to a first communication isolator located outside of the secure area; converting the output to at least one first optical signal; transmitting the at least one first optical signal from the first communication isolator to a secure communication isolator located in the secure area via at least one optical communication link; converting the at least one first optical signal into at least one output signal and transmitting the output signal from the second communication interface to a secure user interface in the secure area, the secure user interface comprising a video display with touch input functionality, a speaker and a microphone; and receiving one or more user inputs to the secure user interface at the second communication isolator; converting the one or more inputs to at least one second optical signal; transmitting the at least one second optical signal from the second communication isolator to the first communication isolator via the at least one optical communication link; generating, via the first communication isolator, an output corresponding to the second optical as an output to the user communication device. In one configuration, optical signals can be separated or multiplexed.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Aspects of the invention comprise methods, devices and systems that allow a user to utilize their mobile (e.g. with wireless communication capability such as cellular, WiFi, etc.) communication device from within a secure area, preferably via a secure user interface that is communicatively coupled to their device which is located outside of the secure area.

As used herein, the term "secure area" or "controlled area" may be any area in which there are restrictions on the use of communication devices, such as cellular phones. As noted above, such areas might comprise military or government installations or other areas where the laws and regulations regarding the security of information apply. These areas might also comprise, however, sensitive areas of corporate offices or manufacturing plants, etc.

Figure 1:
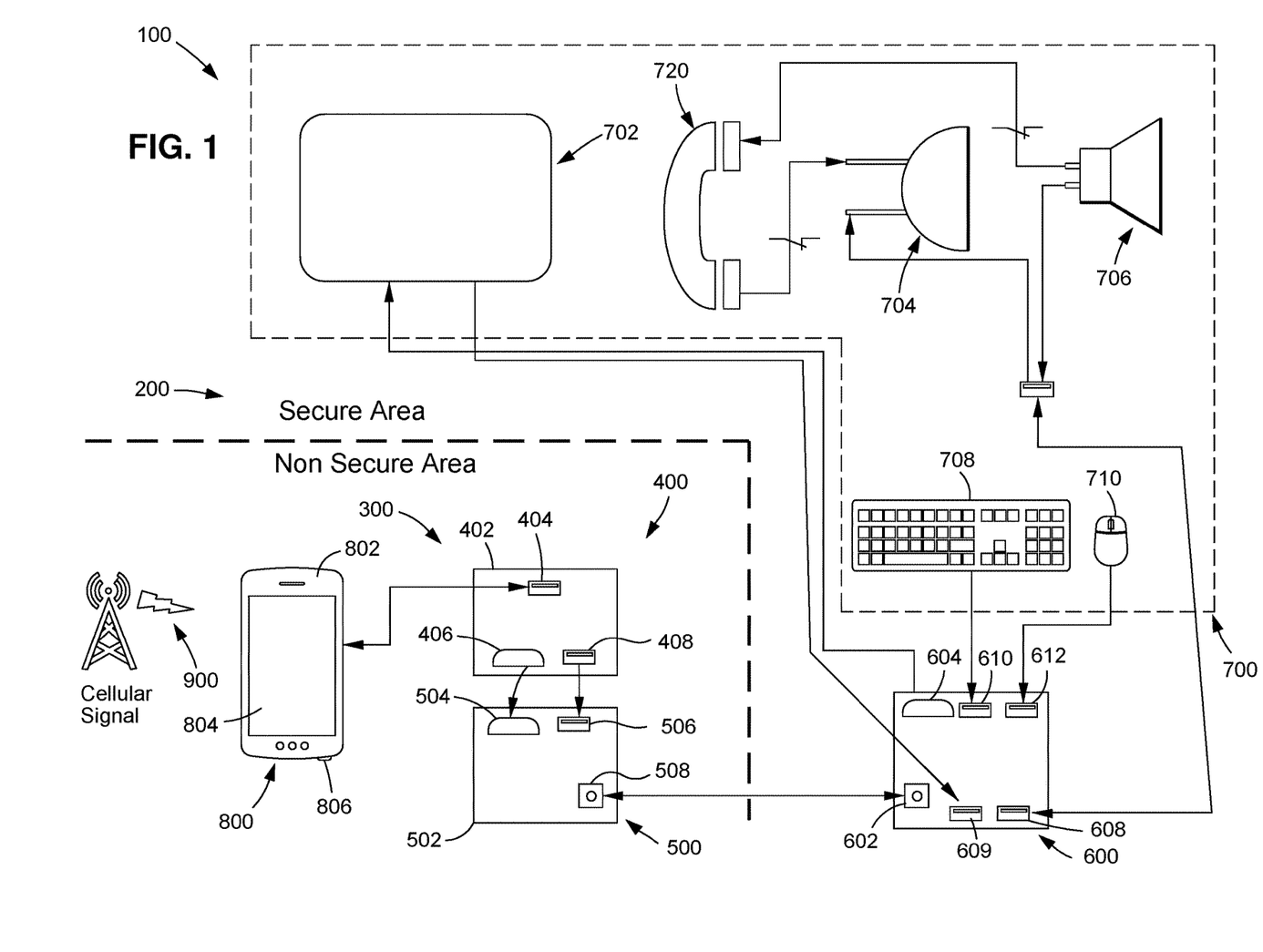
FIG. 1 illustrates one embodiment of a system of the invention.

One embodiment of the invention will be described with reference to FIG. 1. FIG. 1 illustrates one example of a system 100. The system 100 includes components which are located within a secure area 200 and includes components which are located outside of the secure area, which area may be referred to as a non-secure area 300. As indicated above, the type and location of the secure area 200 may vary, and might comprise a government building, military installation, corporate office, etc. The non-secure area 300 may comprise a public space or a private space, such as a portion of the government building, military installation, corporate office or the like which is outside of the secure area 200 (and not within another secure area).

In one example, the system 100 comprises a communication device interface 400, a first communication isolator 500, a second communication isolator 600, and a secure user interface 700.

In a preferred embodiment, the communication device interface 400 comprises a communication interface to a user communication device 800. As described below, in use, the user communication device 800 is located in the non-secure area 300. The communication device interface 400 is thus also located in this same area.

The user communication device 800 may comprise, for example, a cell phone, PDA, tablet or the like which supports communication functionality. The user communication device 800 may include a housing 802, processor, a memory, machine-readable code stored in the memory and executable by the processor (such as in the form of downloaded or installed "applications"), one or more user input devices (such as a touch screen, button(s), microphone, etc.), an information display 804 (such as at least one video display) and one or more peripheral devices, such as a camera, gyroscope, speaker, altimeter, GPS unit, etc.

Moreover, the user communication device 800 includes at least one communication interface. The at least one communication interface preferably supports wireless communications, preferably over at least a cellular network 900, and may permit other forms of communication, such as Wi-Fi, Bluetooth, near field (NF) and other forms of wireless communication, plus wired communications. Such wired communications may be, for example, via a port 806. The configuration of the port 806 might vary, such as depending upon the communication device 800. For example, the port 806 might comprise an Apple® Lightning™ connection port, a USB Type A, Type C, Mini B, Micro B, Micro B Super Speed, ports of other configurations now known or later developed for establishing a wired communication link. The user communication device 800 may comprise, for example, an Apple® iPhone™ device, an Android™-based communication device such as a Samsung® Galaxy™, a Motorola® Razor™, or various other communication devices now known or later developed and which may be produced or provided by various manufacturers. In this regard, the present invention is not limited to any particular device, or the devices manufactured by a particular manufacturer.

In one embodiment, the communication device interface 400 comprises a housing 402, and one or more communication interfaces, such as input/output (I/O) ports. For example, the communication device interface 400 may include at least a first I/O port 404 which serves as a communication interface to the user communication device 800. The configuration of the first I/O port 404 may depend upon the configuration of the wired port of the user communication device 800, but in one embodiment, may comprise a USB type C or type A port. In such a configuration, for example, when the user communication device 800 comprises an Apple® iPhone™, a communication cable having an Apple® Lightning™ male connector may be plugged into the communication port 806 of the communication device, and a USB type A or C connector at the opposing end of the cable may be plugged into the first I/O port 404 of the communication interface 404. Again, it will be appreciated that the configuration of the first I/O port 404 may vary, such as depending upon the configuration of the desired wired communication link between it and the user communication device 800. Further, while in a preferred embodiment, a wired connection, such as a cable, is used to connect the user communication device 800 to the communication interface 400, other types of direct connections may be used (in some instance, wireless communications may be used if entirely in the secure area). For example, in one configuration, the communication interface 400 might be configured as a cradle, such as where the I/O port 404 is configured as a male connector that fits directly into the communication port 806 of the user communication device 800. Further, in some embodiments, assuming such is supported by the user communication device 800, even a wireless communication link might be provided between it and the communication device interface 400 (e.g. such as a Wi-Fi connection).

The communication device interface 400 preferably also includes other I/O ports, preferably serving as at least one communication interface with the first communication isolator 500. For example, the communication device interface 400 may include a second I/O port 406 and a third I/O port 408. In one preferred embodiment, the second I/O port 406 comprise an interface for visual signals or information and the third I/O port 408 may comprise an interface for other types of data. In such a configuration, the communication device interface 400 may include one or more splitters, processors or the like for separating such information as received from the user communication device 800 and/or for assembling such information (from the first communication isolator 500) for transmission thereto. For example, the second I/O port might comprise an HDMI (or DVI or similar) port, while the second I/O port 408 data might comprise a USB port, such as a USB Type A port.

In some embodiments, the communication device interface 400 is configured to interface with a plurality of different user devices. In such a configuration, the communication interface 400 may be configured as a hub, having multiple I/O ports 404 for connection to different user communication devices 800 and which connect to the one more I/O ports which serve as interfaces to the first communication isolator 500.

As described below, the communication device interface 400 communicates with the first communication isolator 500. The first communication isolator 500 is also located in the non-secure area 300.

In one embodiment, the first communication isolator 500 comprises a housing 502, one or more communication interfaces or ports for communicating with the communication device interface 400, and one or more communication interfaces or ports for communicating with the second communication isolator 600 (preferably, as described below, via optical communications).

At least one first I/O port is preferably configured to serve as a communication interface with the communication device interface 400. This may comprise a first I/O port 504 and a second I/O port 506. For example, where one of the I/O ports 406 of the communication device interface 400 is an video port (such as an HDMI port), the first I/O port 504 of the first communication isolator 500 may comprise an HDMI input port. Similarly, where another of the I/O ports 408 of the communication interface 400 comprises a USB port, the second I/O port 506 of the first communication isolator 500 may include a corresponding USB port.

Preferably, the communication device interface 400 is communicatively coupled to the first communication isolator 500. For example, an HDMI cable may be placed in communication with the HDMI port 406 of the communication interface 400 and the HDMI port 504 of the first communication isolator 500.

Most importantly, the first communication isolator 500 is configured to convert signals input thereto from the communication device interface 500 into a non-radio frequency or electrical signal, such as preferably a digital optic signal for transmission to the second communication isolator 600, and to receive such non-radio frequency signals (e.g. digital optical signals) from the second communication isolator 600 and convert them back for transmission to the communication device interface 500. This may be accomplished, for example, by one or more signal processors of the first communication isolator 500. In this configuration, the first communication isolator 500 has at least one I/O port 508 which comprises a communication interface with the second communication isolator 600. Preferably, this comprises a third I/O port 508 which comprises an optical port, such as in the form of a fiber optic cable port.

The output from the first communication isolator 500 is provided to a first I/O port 602 of the second communication isolator 600 which is located in the secure area 200. When the input is a digital optical signal, the first I/O port 602 is preferably an optical port.

Most importantly, the second communication isolator 600 is configured to process and direct incoming signals to the secure user interface 700. As described below, the second communication isolator 600 is also configured to receive signals, such as inputs, from the secure user interface 700 for routing back to the first communication isolator 500 and thereon to the user's communication device 800, via the first I/O port 602 thereof as connected to the third I/O port 508 of the first communication isolator 500.

In one preferred embodiment, the secure user interface 700 comprises a plurality of secure input and output devices. In a preferred embodiment, the secure user interface 700 is configured to effectively serve as a secure extension of the user communication device 800-such as by mimicking outputs and inputs that could be provided directly thereto, but permits such to occur relative to a user who is remote from their device. In one embodiment, these devices comprise a touch-screen display 702 which is configured to display information and receive touch inputs from the user, an audio input device such as a microphone 704, an audio output device such as a speaker 706, and in one example, one or more tactile input devices such as a keyboard 708 and a mouse or mouse pad 710.

The touch-screen display 702 is configured to receive a video input from the second communication isolator 600, such as via a video port 604. This port 604 might comprise, for example, an HDMI, DVI or other video port. An HDMI cable or the like may connect the video output port 604 of the second communication isolator 600 to the touch-screen display 702. In one example, the user inputs to the touch-screen display 702 are input to the second communication isolator 600, such as to a first input port 609 thereof. This input port 609 might comprise, for example, a USB port for touch screen capability. In one example, a USB cable which has a 2.0 Micro connector at one end and a USB Type A connector at the other may be utilized between the touch-screen display 702 and the second communication isolator 600, whereby the second communication isolator 600 provides power and touch screen input to the touch-screen display 702.

In a preferred configuration, the touch-screen display 702 does not include additional functionality such as audio in (such as via a microphone), audio out (such as via a speaker), or video in (such as via a camera). Most preferably, this functionality is preferably provided by separate devices having security features as described below.

In one example, audio signals which are received by the second communication isolator 600 are processed and routed to an I/O port 608 which is communicatively coupled to the speaker 706 and microphone 704, such as via a USB 2.0 Type A cable or USB 3.0 Type A depending on the distant end device 800. Audio inputs from the user are captured by the microphone 704 and are routed to the I/O port 608 of the second communication isolator 600.

User inputs to the keyboard 708 are output therefrom to a second input port 610 of the second communication isolator 600, and user inputs to the mouse 710 are output therefrom to a third input port 612 of the second communication isolator 600. These ports might comprise, for example, USB Type A ports for accepting a corresponding connector of a USB cable.

Figure 2:
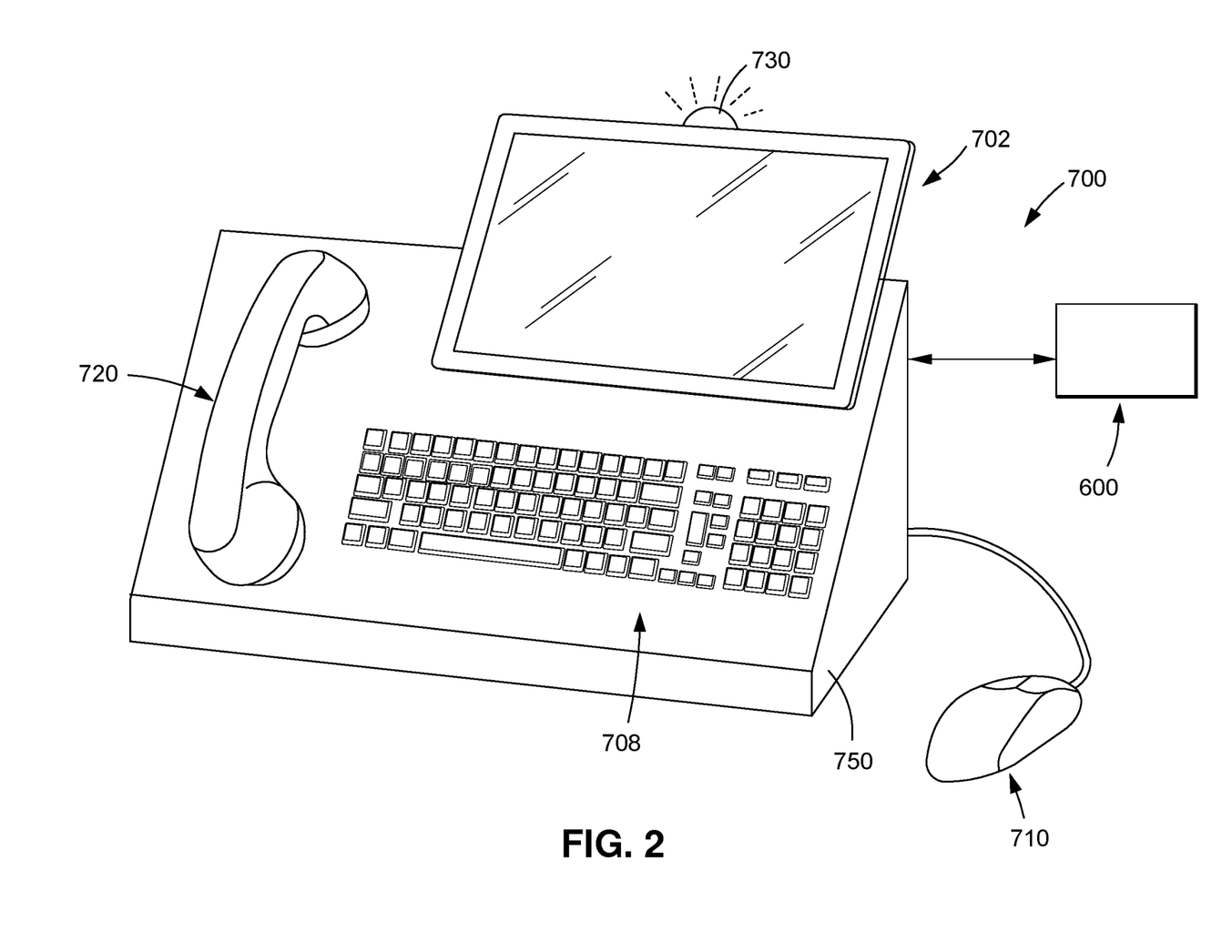
FIG. 2 illustrates an embodiment of a secure user interface of a system of the invention.

Referring to FIG. 2, in one embodiment, the microphone 704 and speaker 706 may be integrated, such as into a handset 720. Further, as illustrated in FIG. 2, the touch-screen display 702, the handset 720 and keyboard 708 might be integrated into (mounted or set on, connected to, etc.) a base 750 or the like, such as for ergonomics and convenience. In such a configuration, for example, the display 702 might be movably mounted to the base 750, such as to permit it to rotate to various positions (such as various angles of tilt in both the horizontal and vertical), etc. The keyboard 708 might be merely set upon a surface of the base, or it might be mounted into the base 750, such as where the keys extend through a top panel thereof or a keyboard may sit on the desk with the mouse.

In a preferred embodiment, although not shown in detail, power supplies which are used to power the devices in the secure area 200 are isolated from those used to power the devices in the non-secure area 300. Power separation between electrical systems in non-secure area 300 and secure area 200 is preferable. For example, the communication device interface 400 and first communication isolator 500 are preferably powered by one or more first power supplies which are associated with the non-secure area 300. On the other hand, the second communication isolator 600 and the elements of the secure user interface 700 are preferably separately powered, preferably associated with the secure area 200.

General operation of the system 100 will now be described with reference to FIG. 1. A user connects their user communication device 800 to the communication interface 400 in the non-secure area 300. The user may then enter the secure area 200 without their user communication device 800.

The output of the user communication device 800 is connected to the communication interface 400, which is in turn routed to the first communication isolator 500 to the second communication isolator 600. The video output of the user communication device 800 is displayed by the touch-screen display 702 and any audio output is output by the speaker 706. In this manner, although the user is located in the secure area 200 and the user communication device 800 is located in the non-secure area 300, the user can see the "display" (e.g. the content which is displayed by) of their device just as if they were looking directly at the video display 804 thereof, and can hear any audio output, such as if they were directly hearing the audio output thereof.

At the same time, the user can interact with their user communication device 800 from within the secure area 200. For example, the user can make touch inputs to the touch-screen display 702 which are routed to the user communication device 800 and provided thereto just as if the user had provided the inputs directly to the display 804 thereof. Further, the user may make other inputs, such as audio inputs via the microphone 704 and/or mouse or keyboard inputs to the mouse 710 and keyboard 708. These inputs are routed through the second communication isolator 600 to the first communication isolator 500 and thereon to the user communication device 800, just as if they were being provided directly to the device 800.

In such a configuration, for example, a user may make and receive telephone calls, read and send text messages, read and send emails, run applications and receive outputs from those applications and make inputs to those applications, etc. For example, a user may input their PIN into the touch-screen display 702 (which is then routed to their user communication device 800) in order to access text, phone, email or other applications and provide inputs thereto. The users communication device 800 remains in communication with cellular networks 900 or other networks (such as via Wi-Fi, etc.), such that the user communication device 800 still acts as digital terminal equipment) "DTE") relative to such communication networks.

At the same time, the user communication device 800 is isolated from the secure area 200 in a manner which solves the problems which are described herein. In particular, the portion of the system 100 which is located in the secure area 200, including the second communication isolator 600 and the secure user interface 700, are components which do not emit wireless signals, such as radio frequency signals. Further, the user communication device 800 is located in the non-secure area 300, so any bugs or the like which might be associated therewith do not influence the secure area 200.

Additional aspects of the invention will be described with reference to FIGS. 3 and 4.

In one embodiment, the system 100 may include other security features. For example, in one configuration, means may be provided for positively connecting and disconnecting the microphone 704 and/or speaker 706.

Figure 3:
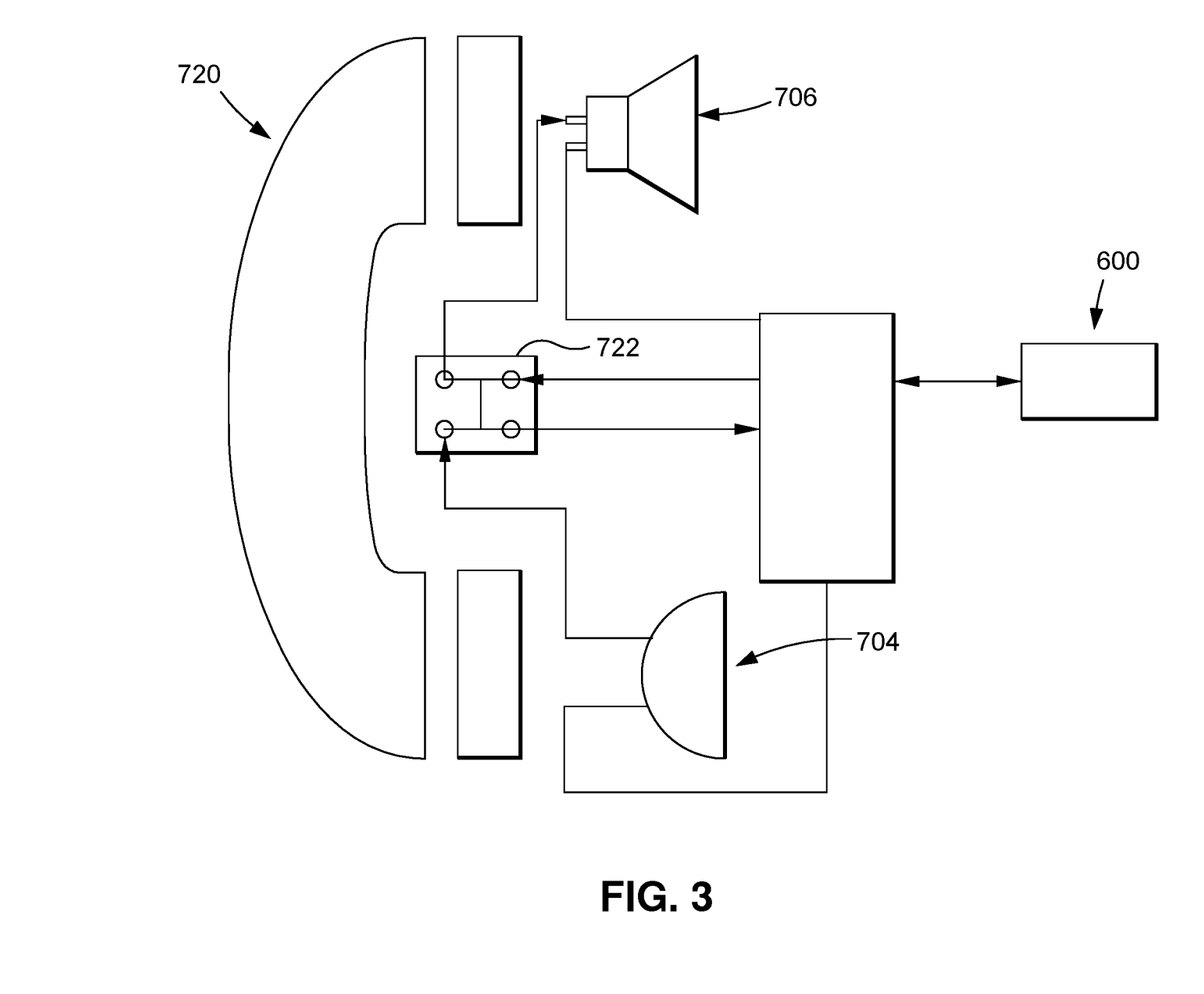
FIG. 3 illustrates an embodiment of a portion of the secure user interface illustrated in FIG. 2.

As one example, as illustrated in FIG. 3, a switch 722 may be associated with the handset 720. This switch 722 may have a first position or mode in which the communication path way to the second communication isolator 600 is open or incomplete, wherein no communication signals pass between the speaker 704 and microphone 706 and the second communication isolator 600, and a second position or mode in which that communication pathway is closed or complete. In one embodiment, the switch 722 might be associated with the handset 720, such as having a portion on the handset 720 which can be manually actuated (such as pressed) to move it from the first position (such as biased to that position) to the second position. In this manner, when a user wishes to use the microphone 704 and/or speaker 706 portions of the secure user interface 700, the user must activate or engage the switch (such as by holding and depressing the switch during the time the user wishes to have the handset 720 be active), and preferably where that switch moves back to the first position when not engaged. This "positive engagement" aspect of the invention reduces the opportunity for the microphone and/or speaker to be used nefariously, such as to listen to sounds in the secure area 200 when it is not being used such as via hacking or bugging of the communications device 800.

Of course, this concept might be applied to other input or output devices of the secure user interface. In some embodiments, more than one switch might be provided, such as one corresponding to the microphone and one corresponding to the speaker.

Figure 4:
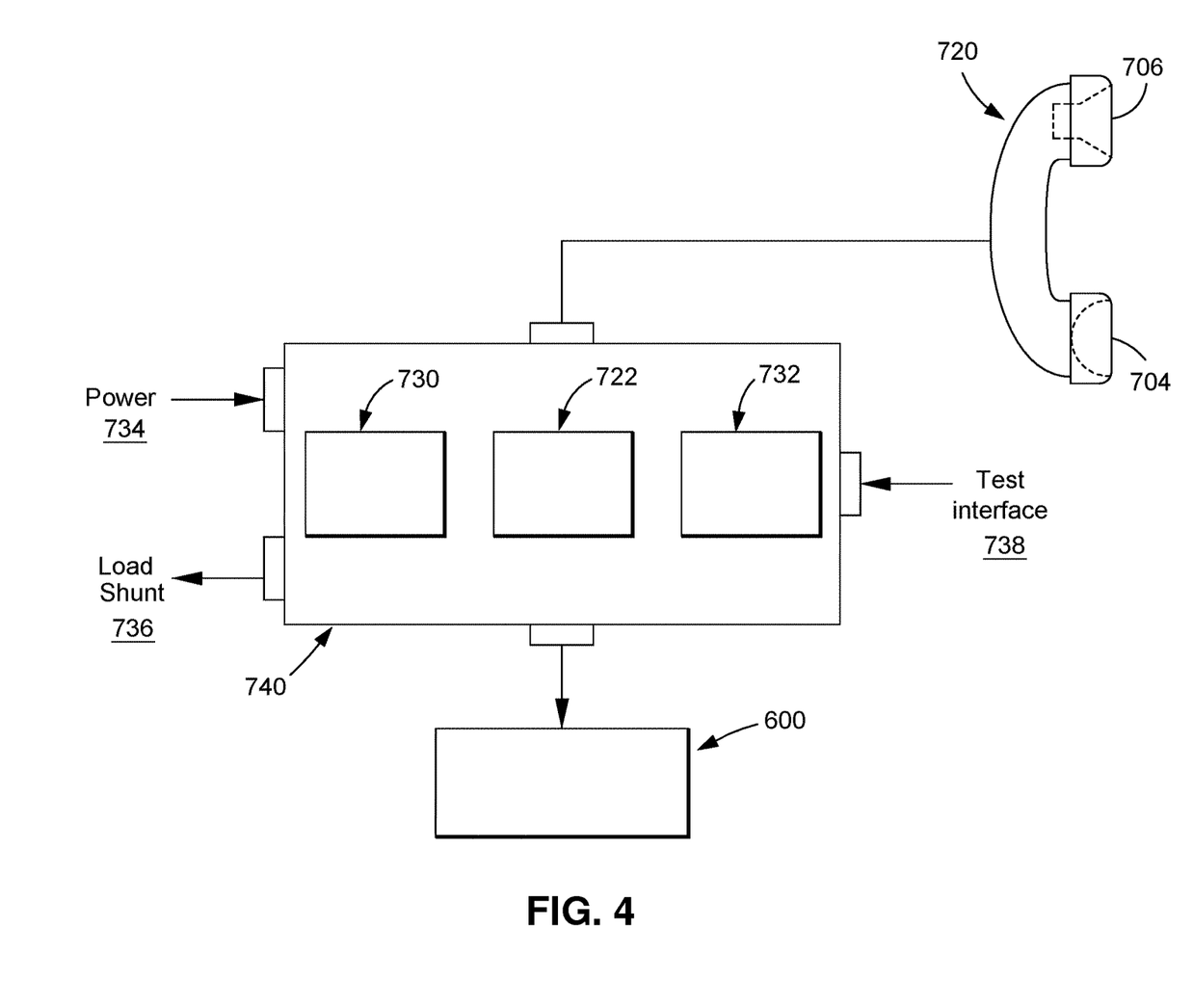
FIG. 4 illustrates another embodiment of a portion of the secure user interface illustrated in FIG. 2.
Figure 5:
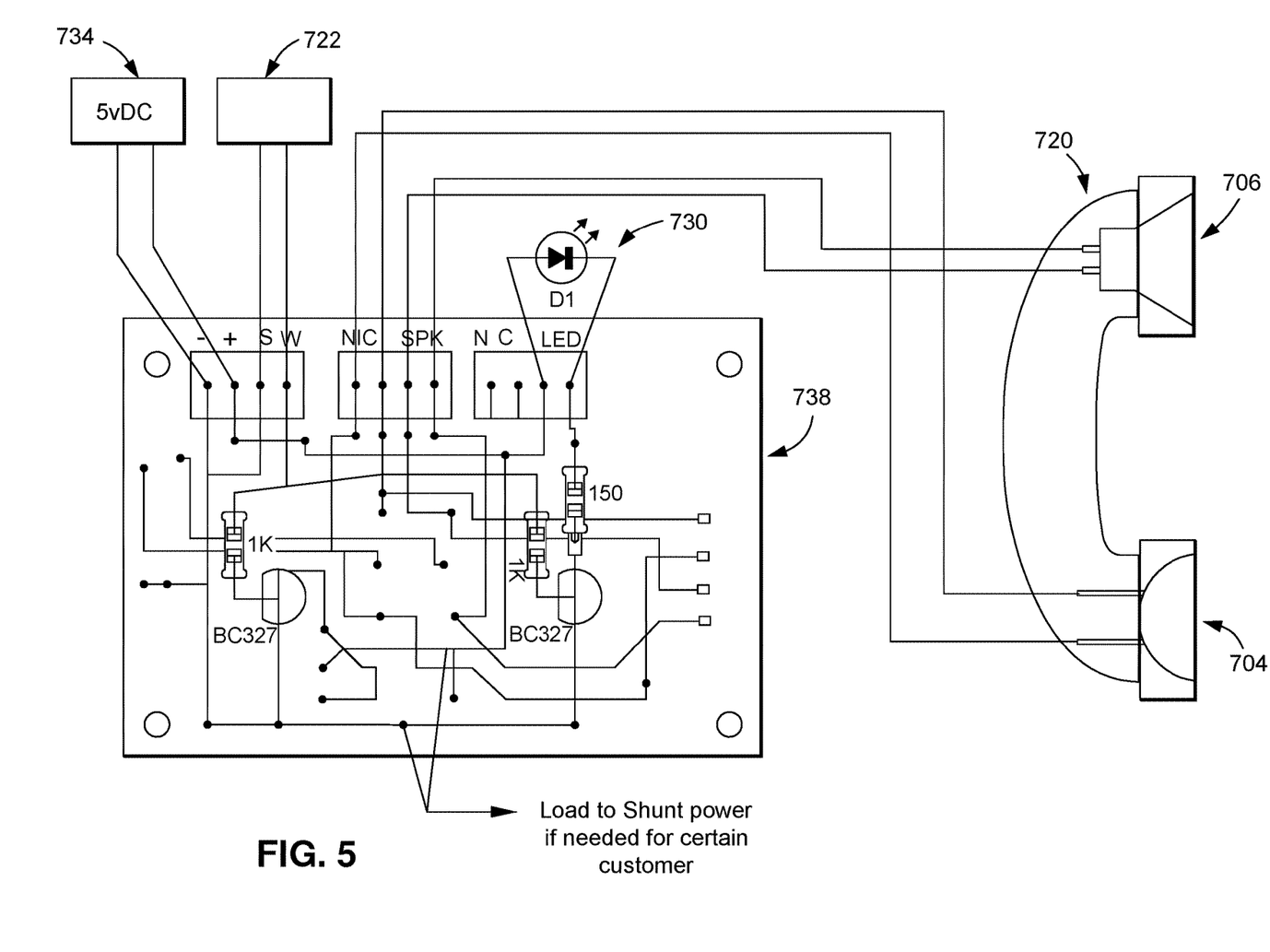
FIG. 5 illustrates an example implementation of the portion of the secure user interface illustrated in FIG. 4.

FIGS. 4 and 5 illustrates another configuration of the invention. As illustrated in FIG. 4, a handset module 740 may comprise the switch 722, one or more illumination devices or lights 730, and at least one audible emitter 732, such as a ringer or buzzer. This module 740 may be located between the handset 720 and the second communication isolator 600. The switch 722 may have similar functionality to that described above and might comprise a push to talk type button or switch. However, in another configuration, the switch 722 may be integrated into a base station or the like which accepts the handset 720 when not in use. When the handset 720 is not in use it may be placed on a portion of the switch 722 that causes the switch to move to an open position, thereby disconnecting the handset 720 from operation, and wherein when a user lifts the handset 720, the switch moves to a closed position, thereby rendering the handset 720 operable (e.g. placing it in communication with the second communication isolator 600) and lighting an LED "730" indicating it is off hook.

In one embodiment, the light 730 may illuminate to indicate when the handset 720 is operable. Thus, the light 730 may illuminate when the switch 722 is closed. As illustrated in FIG. 2, the light 730 may be associated with the base 750, such as by being located at an elevated or visible portion thereof, such as at the top of the display 702. In this manner, those in the vicinity of the secure user interface 700 can be visually warned when it is active.

In one embodiment, the buzzer or ringer 732 may be configured to activate when an incoming signal is received by the user communication device 800 and is routed to the second communication isolator 600, such as to alert a user of the secure user interface 700 that a call, text, email or other communication has been received by the user communication device 800 and may require a response.

As illustrated in FIG. 4, the handset module 740 may have a power input 734, and might include other features, such as a load shunt 736 and technical security test interface 738.

FIG. 5 illustrates one example implementation of the handset module 740, wherein elements of the module 740 are associated with a circuit board.

In examples of the invention, certain configurations and combinations of communication ports or interfaces have been described. It will be appreciated that other configurations or combinations of such ports/interfaces might be utilized. For example, instead of the first communication isolator 500 and second communication isolator 600 communicating via connected I/O optical ports, the first and second communication isolators 500,600 might each have one optical output port and one optical input port, where by the input and output interfaces are separated. In general, different numbers of ports or interfaces might be utilized, such as depending upon whether signals are combined or separately transmitted or by the manufactured configuration of the communications device 800.

As another example, the communication interface 400 and first communication isolator 500 might be integrated, such as into a single unit. In such a configuration, the functionality thereof may be combined. As one example, in such a configuration, the first I/O port 404 of the communication interface 400 might comprise a first I/O port to a single module, where inputs thereto are processed and transmitted to an optical I/O port that is connected to the second communication isolator 600 (so that the intermediate connections between the communication interface 400 and the first communication isolator 500 are effectively eliminated, such as by integration).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system facilitating secure communications with a user communication device from a secure area comprising:
   a communication interface for location in an unsecure area, said communication interface comprising a first communication port for connection to a communication port of said user communication device and at least one second communication port;
   a first communication isolator for location in said unsecure area, said first communication isolator comprising at least one first communication port for connection to said at least one second communication port of said communication interface and at least one optical communication port;
   a second communication isolator for location in a secure area, said second communication isolator comprising at least one optical communication port for connection to said at least one optical communication port of said first communication port to permit communications between said first and second communication isolators via an optical communications channel and at least one user interface communication port; and
   a secure user interface for location in said secure area, said secure user interface comprising at least one communication port for connection to said at least one user interface communication port, said secure user interface comprising a video display having touch input, at least one speaker and at least one microphone;
   whereby a user within said secure area may securely communicate with their user communication outside said secure area via said secure user interface, including providing inputs to the user communication device and receiving outputs therefrom.

2. The system in accordance with claim 1, wherein said user communication device comprises a communication device with cellular and or WiFi communication capabilities.

3. The system in accordance with claim 1, wherein said user communication device comprises a housing, a processor, a memory, a display and machine readable code stored in said memory and executable by said processor to generate an output for display by said display.

4. The system in accordance with claim 3, wherein said output for display by display is input to said communication interface, provided to by said communication interface to said first communication isolator, transmitted from said first communication isolator to said second communication isolator, and provided from said second communication isolator to said video display of said secure user interface for display by said video display.

5. The system in accordance with claim 3, wherein a touch input to said video display of said secure user interface is provided to said second communication isolator and the transmitted from said second communication isolator to said first communication isolator, is then provided to said communication interface and is output from said communication interface to said user communication device.

6. The system in accordance with claim 1, wherein said at least one speaker and at least one microphone are associated with a user handset.

7. The system in accordance with claim 6, further comprising at least one switch for connecting and disconnecting said handset from said second communication isolator.

8. The system in accordance with claim 6, wherein said at least one switch comprises a switch associated with said handset which must be depressed to activate said handset.

9. The system in accordance with claim 7, wherein said secure user interface further comprises at least one light, said light configured to be illuminated when said at least one switch connects said handset to said second communication isolator.

10. The system in accordance with claim 1, wherein said secure user interface further comprises an audible signal emitter which emits an audible signal in response to said second communication isolator receiving input from said user communication interface.

11. The system in accordance with claim 10, wherein said input from said user communication device comprises a signal indicating an incoming call to said user communication interface.

12. The system in accordance with claim 1, wherein said secure user interface further comprises a keyboard and mouse.

13. The system in accordance with claim 12, wherein said at least one speaker, said at least one microphone, said video display and said keyboard are associated with a base station.

14. A method of facilitating secure communications to and from a user in a secure area via an unsecured user communication device comprising the steps of:
- receiving, at a communication interface located outside of said secure area, an output from said user communication device;
- transmitting said output to said communication interface to a first communication isolator located outside of said secure area;
- converting said output to at least one first optical signal;
- transmitting said at least one first optical signal from said first communication isolator to a secure communication isolator located in said secure area via at least one optical communication link;
- converting said at least one first optical signal into at least one output signal and transmitting said output signal from said second communication interface to a secure user interface in said secure area, said secure user interface comprising a video display with touch input functionality, a speaker and a microphone; and
- receiving one or more user inputs to said secure user interface at said second communication isolator;
- converting said one or more inputs to at least one second optical signal;
- transmitting said at least one second optical signal from said second communication isolator to said first communication isolator via said at least one optical communication link;
- generating, via said first communication isolator, an output corresponding to said second optical as an output to said user communication device.

15. The method in accordance with claim 14, comprising converting said at least one first optical signal to a first output signal comprising a video signal which is output to said video display and a second output signal comprising an audio signal which is output to said speaker.

16. The method in accordance with claim 14, wherein said one or more user inputs comprise a touch input to said video display and an audio input to said microphone.

17. The method in accordance with claim 14, further comprising the step of engaging a switch associated with a handset to activate said speaker to generate an audio output and to activate said microphone to receive an audio input.

18. The method in accordance with claim 17, further comprising generating a visible alert in response to engagement of said switch.

19. The method in accordance with claim 14, wherein said output from said user communication device comprises a signal indicating receipt of a communication from a public or private communication network at said user communication device.

20. The method in accordance with claim 19, further comprising generating an audible alert in said secure area based upon said signal.

\* \* \* \* \*